BEST AVAILABLE COPY

DEFENSIVE PUBLICATION T 857,017

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 10, 1968

857 O.G. 367

651,682

ESTERS OF ALKANEDIOIC ACIDS AND AROXYPHENOLS AND LUBRICANT COMPOSITIONS

John W. Thompson and Glenn C. Jones, both % Tennessee Eastman Company, P.O. Box 511, Kingsport, Tenn. 37662

Filed July 7, 1967. Published Dec. 10, 1968

Class 252—57

No Drawing. 16 Pages Specification

An ester-type lubricant of improved elevated temperature stability having the formula

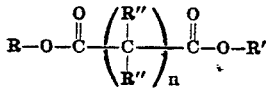

with R phenoxyphenyl or other aroxyaryl, R′ phenoxyphenyl, phenyl, or other aroxyaryl or aryl, R″ lower alkyl and *n*, 1 or 2. Antioxidants, antiwear additives, antifoam additives, metal deactivators and viscosity index improvers may be used in the lubricant in minor amounts.